F. C. WASSMAN & M. E. WIDELL.
SOLDERING PROCESS.
APPLICATION FILED MAR. 5, 1908.
975,913.
Patented Nov. 15, 1910.
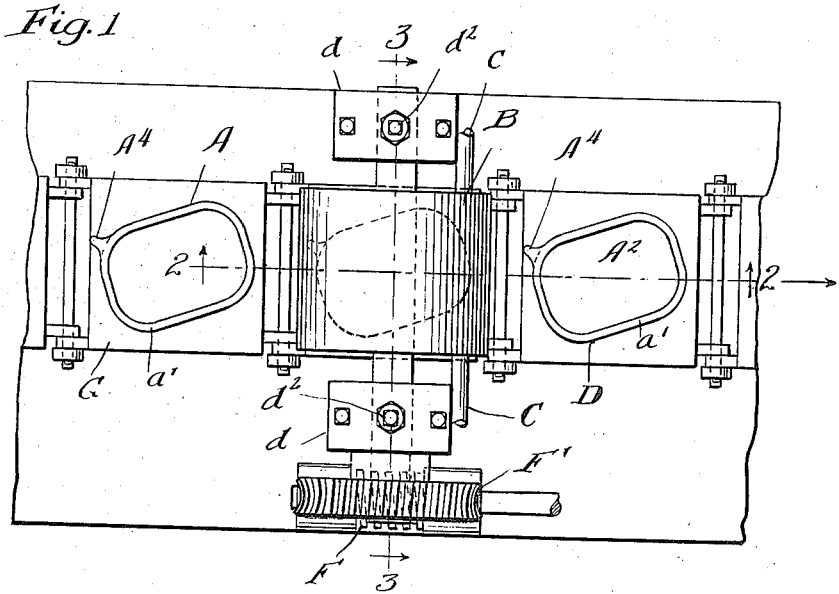
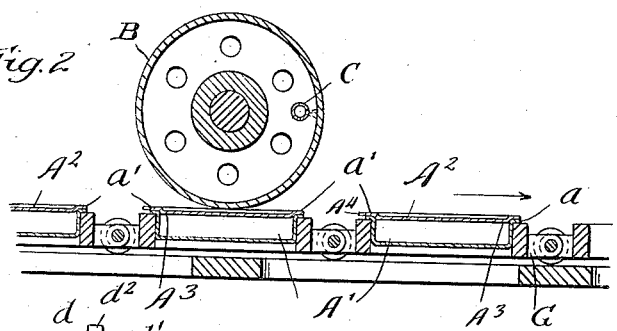
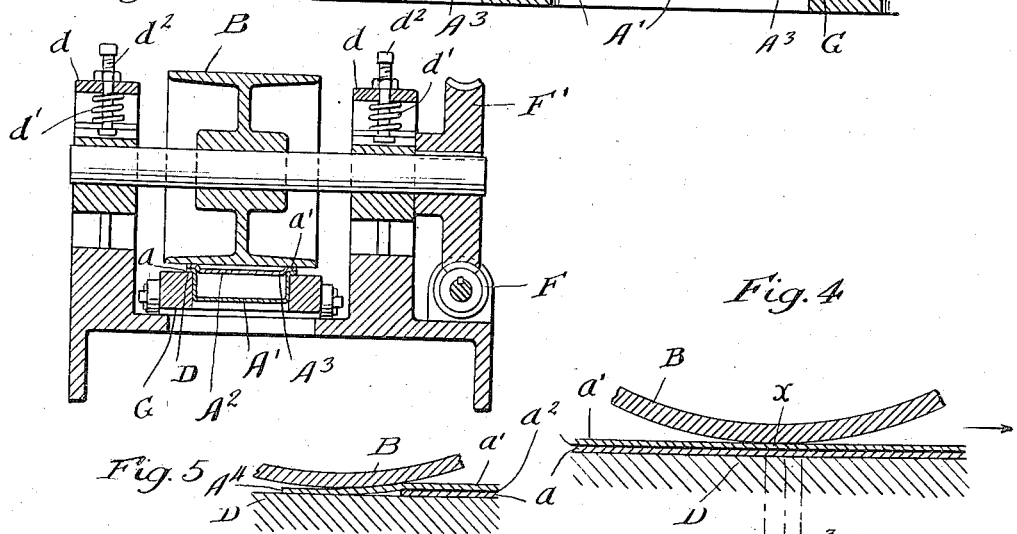
Witnesses:
Wm. Geiger
H. W. Munday
Inventors:
Fred C. Wassman
Magnus E. Widell
By Munday, Evarts, Adcock & Clarke.
Attorneys

UNITED STATES PATENT OFFICE.

FRED C. WASSMAN, OF CHICAGO, AND MAGNUS E. WIDELL, OF MAYWOOD, ILLINOIS, ASSIGNORS TO AMERICAN CAN COMPANY, OF NEW YORK, N. Y., A CORPORATION OF NEW JERSEY.

SOLDERING PROCESS.

975,913.  Specification of Letters Patent.  Patented Nov. 15, 1910.

Application filed March 5, 1908. Serial No. 419,257.

*To all whom it may concern:*

Be it known that we, FRED C. WASSMAN, a citizen of the United States, residing in Chicago, in the county of Cook and State of Illinois, and MAGNUS E. WIDELL, a citizen of the United States, residing at Maywood, in the county of Cook and State of Illinois, have invented a new and useful Improvement in Soldering Processes, of which the following is a specification.

This invention relates to the art or process of soldering seams or joints of cans or other sheet metal articles.

Heretofore the seams or joints of sheet metal cans and other articles have ordinarily been soldered by heating the joint throughout its entire extent or a considerable portion thereof to the fusing point of the solder, the parts of the can or article adjacent to the joint being also heated, and then the solder being applied, either before, during or after the heating operation, the heated joint and the portions of the sheet metal adjacent thereto have been cooled and the solder set while the parts or members of the joint to be united by the solder have been maintained in proximate contact with each other. This old method or process of soldering by heating the whole or a considerable portion of the joint and the parts of the can or article adjacent thereto requires a large amount of heat or fuel, as quite a large quantity, surface or area of sheet metal is required to be raised to and maintained at a high or fusing temperature for a considerable period of time. The old method or process of soldering also requires a comparatively large amount of solder as the members or parts of the joint to be united with the solder are not always in the closest possible contact throughout the entire extent of the seam or the portion thereof being soldered at any one time, thus leaving crevices or spaces to be filled with solder and thereby increasing the amount of solder otherwise required to form the joint. The old method or process of soldering is also attended with great difficulty in producing with certainty and uniformity, hermetically tight soldered joints or seams, because it is difficult to maintain the parts of the joint throughout the whole extent of its length or the considerable portion thereof at which the solder is fused or molten in the necessary, perfect and close contact while the joint is being cooled and the solder setting; and also because it is difficult to keep the fused or molten solder properly and evenly distributed throughout the entire extent of the joint or fused portion during the cooling or setting operation. And in the old method or process of soldering, the difficulty of producing with certainty and uniformity hermetically tight solder joints or seams is also very greatly increased or aggravated in cases where the work being done is the soldering of final heads or covers on filled cans, owing to the heat of the soldering operation generating steam or gases under pressure within the can or vessel, which, tending to escape through the fused solder of the joint, produce fine pin holes or leaks.

The object of this invention is to provide a new method or process of soldering by means of which the soldering may be done with a minimum expenditure of heat or fuel, and with a minimum amount of solder, and whereby at the same time, hermetically tight solder joints may be produced with certainty and uniformity whether the cans be filled or empty, and all danger of leaks or pin holes being formed by steam or gases under pressure in the can tending to force a way out through the fused or setting solder entirely eliminated, as well as the other difficulties heretofore experienced.

The invention consists in the method or process discovered and herein described by which this object or result is practically accomplished. That is to say, it consists in the discovery that hermetrically tight soldered joints or seams may be certainly and uniformly produced with a minimum expenditure of heat or fuel and with a minimum quantity of solder by first coating the contacting surface of one member of the joint with solder and then, the members of the joint being assembled, subjecting the joint, point after point of its length or extent, or minute seam-area after minute seam-area, momentarily and progressively and successively, to the action of heat and pressure, the heat being applied upon one side only of the joint and directly at the point or minute seam-area at the time under pressure, and while the opposite side of the joint is continuously subjected to a cooling action both at the instant of heating and fusing and immediately thereafter; so that the solder film between the members of the joint is progressively fused and progressively set, the setting at each point of minute area taking place almost instantaneously or immediately after the fusing; and so that the members of the joint at the point or minute area where the solder is being fused are held in close and perfect contact with each other by the pressure applied at the fusing point in connection with the setting and completely set portions of the seam or joint directly or slightly farther in advance of the point or minute area under pressure and being fused.

In practicing the invention, any suitable means, tools or devices may be employed for progressively subjecting the seam or joint point after point, or minute area after minute area, momentarily to the action of heat and pressure to produce the progressive fusing of the solder and the progressive setting thereof; but a hollow rotating heated roller, having a gas burner for projecting flame into it, is preferably the means employed for progressively applying heat and pressure to the seam or joint, the can or article (the seam of which is being soldered) being supported and conveyed under the heated roller by a movable cooling device, die or holder which engages the opposite side of the seam from the heated roller to resist the pressure thereof and thus acts as the opposing pressure device in conjunction with the roller. This cooling device, die, holder or opposing pressure device, not being heated, aids materially the quick progressive setting of the solder at each successive point or minute area of the seam after passing or being acted upon by the heated roller. As the heat and pressure are thus applied only to one point or minute area of the seam or joint at a time by the heated roller or other like device, and as only a very small portion or area of the seam is heated to the fusing degree at any one time, and as the portions of the can or article adjacent to the seam are not heated at all, a very small amount of heat-energy or fuel is required; while at the same time the heating or fusing is done very quickly at each successive point or minute area of the seam, and the setting or cooling of the fused solder also quickly and almost instantaneously follows up the fusing, point after point, or minute area after minute area. The consequence or result of this is that the fusing and soldering apparently take place in the somewhat surprising or paradoxical manner of neither heating the article nor can, its contents, nor even the seam or joint itself which is soldered, because the moment the can, article or seam is soldered by this process, the same is apparently as cool as it was before the soldering operation began and may be grasped with the hand the instant it issues from the heated roller or progressive fusing or soldering device. And as in this invention the pressure upon the parts or members of the seam to be united by the solder is applied only to one point or minute area of the seam or joint at a time by the heated roller or other like device in conjunction with the coöperating cooling pressure device, can-holder, die or other like cooling instrumentality, and directly at the point or minute area of the seam which is at the instant fused, the pressure, however limited in degree, is sure to hold or maintain the members of the seam at each particular minute area thereof where the solder is being fused and being set in close and perfect contact with each other, and entirely free from crevices or vacant spaces between them; so that perfect soldering may be effected with a very limited or minimum amount of solder. And as the fusing and soldering are done as before stated without any appreciable heating either of the article or can or its contents or the portion thereof adjacent to the seam, or even of the seam or joint being soldered, (so far as any considerable or appreciable extent of such seam or joint is concerned,) the soldering takes place without any tendency whatever to produce steam or other gases under pressure within the can; so that all danger of any escaping steam or gas producing pin holes or leaks is entirely eliminated or prevented.

As it is only the seam portion of the can or article that is heated, at all, and as this seam portion is heated progressively, or successively, point after point, or minute seam-area after minute seam-area, it is only a very small portion of the seam that is heated to the fusing point at any one time; so that the cool, unheated adjacent portions of the seam and of the can or article, being cool themselves, materially aid the opposing lower or cooling pressure device in progressively and quickly or almost instantaneously cooling and setting each successive fused point or minute area of the seam. As the solder film or coating is already fusibly united to the tin coat surface of one member of the seam, the soldered joint which unites the two members of the seam is in one sense half formed before the progressive fusing and setting operation takes place; and it is for this reason of material advantage in practicing the invention that the cooling pressure device should contact directly with that member of the seam to which the solder coating or film is already fusibly united, and that the heated pressure device should contact directly with that member of the seam whose tin coat surface requires yet to be fusibly united with the solder film or coating on the other member of the seam.

As the heated roller or pressure device only contacts with the seam or joint upon one side thereof, while the opposing can-holder, die or pressure device, which contacts with the other side of the seam remains cool or unheated, the action of the heated pressure device on one side in conjunction with the cooling pressure device on the other side of the seam, in effect, causes the heating or fusing action to extend only sufficiently through the joint to effect the proper fusing of the solder; and thus causes the fused solder at the particular point or minute area of the seam directly contacting with the heated roller or pressure device to very quickly and almost instantaneously set or cool as soon as such point or minute area passes out of direct contact with the heated roller or pressure device.

In soldering the end seams of rectangular cans, such, for example, as sardine cans, the heated roller is applied diagonally to the seam so that the portion of the seam which is at one corner of the can will be the last portion fused and soldered. This is especially useful in soldering the final heads upon filled cans as it leaves any surplus liquid or other fluid within the can free to be pressed out or escape at the final corner portion of the seam which passes last under the heated roller, and thus prevents escaping liquid or fluid from interfering with the fusing and soldering operation until the last point of the seam is closed by the pressure of the heated roller and fused and set or soldered. In soldering such cans, the covers of which have integral key opening tongues, the corner of the can at which the tongue is located should be the last to pass under the heated roller in the progressive soldering operation, as the projecting tongue causes the seam to leave the heated pressure roller more smoothly and as the projecting portion of the tongue still under the pressure of the roller tends to hold the two members of the seam directly in advance thereof in close contact until the solder therebetween becomes fully set.

In the accompanying drawing forming a part of this specification, tools or devices suitable for use in practicing the invention are indicated to enable the process or method to be more readily understood by those skilled in the art.

In said drawing, Figure 1 is a plan view; Fig. 2 is a vertical section on line 2—2 of Fig. 1; Fig. 3 a vertical section on line 3—3 of Fig. 1; Fig. 4 an enlarged detail vertical section in the direction of the length of the seam and illustrating the progressive fusing and setting or soldering operation. Fig. 5 is a similar view illustrating the action of a projecting tongue on the cover in holding the two members of the seam directly in advance thereof in contact with each other.

In the drawing, A represents a sheet metal can or other article of tin plate having a body portion $A^1$ furnished with a soldering flange or joint member $a$ and a cover $A^2$ having a soldering flange or joint member $a^1$. The soldering flange or joint member of one of these parts, preferably the body part, is furnished with a thin film or coating of solder $a^2$ applied thereto and fusibly united therewith before the can is filled.

The cover A is preferably countersunk as indicated in the drawing so that the countersunk portion $A^3$ thereof may fit within the upper end or mouth of the body part $A^1$; and the cover $A^2$ preferably also has an integral projecting tongue $A^4$ at one corner to enable the can to be opened with a key in the usual manner.

B is a heated pressure device, by means of which heat and pressure may be applied progressively to the members of the seam or joint to be united by the solder, that is to say, point after point, or minute area after minute area successively. This heated pressure device preferably consists of a hollow cylindrical roller, and the same is preferably heated by a gas or other burner C by which flame may be projected inside the hollow roller.

D is an opposing cooling pressure device, preferably in the form of a non-heated die or holder for the can or other article to be soldered, and which engages the seam or joint on the opposite side from the heated roller pressure device and opposes the pressure thereof.

To insure proper pressure being exerted progressively against each successive portion of the seam as it passes under the roller, the bearings $d$ of the roller are preferably movable or adjustable and furnished with springs $d^1$ and adjusting screws $d^2$ for regulating the tension of the springs as indicated in the drawing.

To cause the seam to be subjected uniformly and progressively to the action of the heated roller, the roller is rotated at a uniform speed, this being preferably done by a worm F and worm gear $F^1$ as indicated in the drawing.

To cause the seam of the can or other article to be brought successively point after point, or minute area after minute area, into contact with the heated roller, the holder or die D supporting the same is preferably movable or mounted upon or forms part of a movable carrier as G.

In practicing the invention, a series or plurality of dies, holders or opposing cooling pressure devices D are preferably employed, which pass one after another under the heated roller or pressure device B. This prevents the dies or holders D from becoming heated to any material extent by reason of temporary proximity to the heated roller, as they pass under it, and thus causes each to act more efficiently in cooling and setting the solder at each successive point or minute area at any one time fused.

In practice, it is preferred to make the heated pressure device or roller B about six inches in diameter and to pass the seam in contact therewith at the rate of about one inch per second, though the speed, however, may be materially varied, depending upon the degree to which the pressure roller is heated, and the character of the solder and other conditions.

If the can or article to be soldered is of a rectangular form, as indicated in the drawing, its holder is preferably arranged so that it will pass cornerwise or in a diagonal direction under the roller. And if the cover of the can is furnished with a tongue, as illustrated in the drawing, the corner thereof bearing the tongue should be the last to pass under the roller as indicated in the drawing, as the tongue corner will pass more evenly and smoothly from under the roller than a plain corner, and as the heated pressure roller by its final engagement with the tongue will thus hold the members of the seam at the final corner in contact with each other until the tongue also leaves the roller.

It is preferred to have the lower or cooling pressure device the movable or traveling one instead of mounting the upper or heated pressure device on a movable carrier to give the required relative or translating movement to the upper and lower pressure devices in respect to each other. As the lower or cooling pressure device travels in respect to the heated roller, it will be understood that the particular portion of the cooling pressure device directly tangential to or under the heated roller is constantly changing so that the heated pressure device continually coöperates with a new or cool portion of the lower pressure device, and that there is thus little tendency for the cooling pressure device to become materially heated. The fresh or cool cans put one after another into the lower pressure device also tends to prevent any material or injurious rise in temperature of the cooling pressure device. Ordinarily in practice, it is not found necessary to subject the cooling pressure device to an air blast or other means for keeping its temperature sufficiently low to enable it to act efficiently as a cooling or setting device for the solder. In practice, it is not often that the temperature of the holders D at any time rises above that comfortable for the hand to rest upon. And as this solder cooling or setting device will act efficiently to set the solder if its temperature is a few hundred degrees below that of the solder fusing point, it will be readily understood that successful operation will not be endangered by a small rise of temperature in the cooling device D owing to its proximity to the heated roller or pressure device B. The cans or articles being soldered also act to shield the pressure device D from the radiant heat of the roller B.

In Fig. 4 of the drawing, the progressive fusing and progressive setting operation is diagrammatically indicated. The solder coating $a^2$ between the two members of the seam $a$ $a^1$ directly at the tangential contacting point $x$ of the upper seam member $a^1$ with the heated roller B, is fused for a minute or limited area, as indicated, for example, between the lines $x^1$ $x^2$ because of the direct contact of the heated roller with the upper side of the seam at the tangential point $x$ and its very close proximity thereto for a very slight distance at each side of this tangential point; and then immediately as the seam and its cooling device or holder D travels in the direction indicated by the arrow, this fused portion immediately begins to set because of its separation from the heated roller and of the cooling action of the lower pressure device D with which the lower member of the seam remains continuously in contact and because of the cooling action of the surrounding portions of the seam itself and the immediately adjacent cool portions of the cover and body of the can adjacent to the seam, which all aid in very quickly subtracting temperature from the minute fused area of solder sufficient to cause the setting thereof; so that the minute area of fused solder almost instantaneously becomes set. If, as indicated at Fig. 4 in the drawing, the solder $a^2$ between the lines $x^1$ $x^2$ may be considered as in a fused condition, that between the lines $x^2$ $x^3$ may be considered as in a setting condition and that in advance of the line $x^3$ in a set condition. It will thus be readily understood from Fig. 4 that as the cooling pressure device D remains constantly and directly in contact with the lower member of the seam, and as the heated pressure device B contacts with the upper member of the seam only momentarily and successively, point after point, or minute area after minute area, the members of the seam are pressed into very close and intimate contact with each other during the whole period that anyone particular minute seam-area is under the solder fusing and solder setting operation, and that the members of the seam have no tendency or possibility of springing apart or separating after the fushing action takes place at any particular point before that particular point is securely united by the setting of the solder, the setting following so quickly and closely the fusing, and taking place at a point so near that which the heated roller contacts with the upper member of the seam and clamps or presses it firmly against the lower or cooling pressure device.

It will, of course, be understood, that while the line $x$ correctly indicates the tangential or contacting point between the heated pressure roller and the seam, the point $x^1$ where the solder is represented as becoming fused and $x^2$ where it is represented as again beginning to set and $x^3$ where the solder is indicated as again having become sufficiently firmly set to exert material holding action in keeping the members of the seam in close contact with each other, are simply intended to illustrate the principle and operation of the progressive fusing and progressive setting, and are not intended to represent the exact points at which the fusing of the solder begins or its setting begins or ends, as the same will necessarily vary with the character of the solder and with the speed of movement of the can or its holder and with the temperature of the heated roller and other conditions.

Having thus described the invention, what is claimed is:

1. The process or method of soldering seams or joints of cans or other tin plate articles, consisting in first coating the contacting surface of one member of the joint with solder, and then, the members of the joint being assembled, subjecting the joint, point after point of its length or extent, or minute area after minute area, momentarily and successively or progressively to the action of heat and pressure simultaneously applied, while one side of the joint throughout its whole extent is simultaneously subjected to a cooling action, substantially as specified.

2. The process or method of soldering seams or joints of cans or other tin plate articles, consisting in first coating the contacting surface of one member of the joint with solder, and then, the members of the joint being assembled, subjecting the joint, point after point of its length or extent, or minute area after minute area, momentarily and successively or progressively to the action of heat and pressure simultaneously applied, the heat being applied upon one side only of the joint and directly at the point or minute area of the joint at the time under pressure and the opposite side of the joint throughout its whole extent being constantly subjected to a cooling action, whereby the solder film between the members of the joint is progressively fused and progressively set, substantially as specified.

3. The process or method of soldering seams or joints of cans or other tin plate articles, consisting in first coating the contacting surface of one member of the joint with solder, and then, the members of the joint being assembled, subjecting the joint, point after point of its length or extent, or minute area after minute area, momentarily and successively or progressively to the action of heat and pressure simultaneously applied, the heat being applied upon one side only of the joint and directly at the point or minute area of the joint at the time under pressure and the opposite side of the joint throughout its whole extent being constantly subjected to a cooling action, whereby the solder film between the members of the joint is progressively fused and progressively set, and holding or maintaining the members of the joint at the point or minute area thereof where the solder is being fused in close and perfect contact with each other until each successive fused area of solder sets, substantially as specified.

4. The process or method of soldering seams or joints of cans or other tin plate articles, consisting in first coating the contacting surface of one member of the joint with solder, and then, the members of the joint being assembled, subjecting the joint, point after point of its length or extent, or minute area after minute area, momentarily and successively or progressively to the action of heat and pressure simultaneously applied, the heat being applied upon one side only of the joint and directly at the point or minute area at the time under pressure, and the opposite side of the joint throughout its entire extent being simultaneously subjected to a cooling action, so that the solder film between the members of the joint is progressively fused and progressively set, substantially as specified.

5. The process or method of soldering seams or joints of cans or other tin plate articles, consisting in first coating the contacting surface of one member of the joint with solder, and then, the members of the joint being assembled, subjecting the joint, point after point of its length or extent, or minute area after minute area, momentarily and successively or progressively to the action of heat and pressure simultaneously applied, the heat being applied upon one side only of the joint and directly at the point or minute area at the time under pressure, and the opposite side of the joint throughout its entire extent being simultaneously subjected to a cooling action, so that the solder film between the members of the joint is progressively fused and progressively set, the non-heated side of the joint being the member thereof having the solder coating, substantially as specified.

6. The process or method of soldering tin plate seams consisting in subjecting the members of the seam, one of which is solder coated progressively at successive portions to the action of heat and pressure simultaneously applied, the heat being applied only to the member of the joint which does not bear the solder coating and the opposite member of the joint being simultaneously subjected throughout its entire extent to a cooling action, substantially as specified.

7. The process or method of soldering tin plate seams consisting in subjecting the members of the seam, one of which is solder coated, progressively at successive portions to the action of heat and pressure simultaneously applied, the heat being applied to the seam only, and only upon one side thereof, and directly at the portion thereof at the time under pressure and the opposite member of the joint being simultaneously subjected throughout its entire extent to a cooling action, substantially as specified.

8. The process or method of soldering tin plate seams consisting in subjecting the members of the seam, one of which is solder coated, progressively at successive portions to the action of heat and pressure simultaneously applied, the heat being applied upon one side only of the seam and directly at the portion thereof at the time under pressure, and the opposite side of the seam throughout its entire extent being simultaneously subjected to a cooling action, substantially as specified.

9. The process or method of soldering tin plate seams consisting in subjecting the members of the seam, one of which is solder coated, progressively at successive portions to the action of heat and pressure simultaneously applied, the heat being applied upon one side only of the seam and directly at the portion thereof at the time under pressure, and the opposite side of the seam throughout its entire extent being simultaneously subjected to a cooling action, and the side of the seam to which the heat is applied being other than the one bearing the solder coating, substantially as specified.

10. The process or method of soldering seams of cans or other tin plate articles, consisting in subjecting one side of the seam throughout its entire extent to a cooling action and in progressively fusing and progressively setting a solder film or coating between the members of the seam and fusibly united with one member thereof by subjecting successive minute portions of the seam momentarily to the action of heat and pressure simultaneously applied, substantially as specified.

11. The process or method of soldering seams of cans or other tin plate articles, consisting in subjecting one side of the seam throughout its entire extent to a cooling action and in progressively fusing and progressively setting a solder film between the members of the seam and fusibly united with one member thereof while the members of the seam are subjected at successive portions thereof momentarily to the action of heat and pressure simultaneously applied, substantially as specified.

12. The process or method of soldering seams of cans or other tin plate articles, consisting in subjecting one side of the seam throughout its entire extent to a cooling action and in progressively fusing and progressively setting a solder film or coating between the members of the seam and fusibly united with one member thereof while the members of the seam are under heat and pressure simultaneously applied at successive minute portions thereof, substantially as specified.

13. The process or method of soldering seams of cans or other tin plate articles, consisting in subjecting the seam point after point of its length or extent or minute area after minute area successively to the action of heat and pressure simultaneously applied, the heat being applied upon one side only of the seam and directly at the minute area at the time under pressure, and the opposite side of the seam throughout its entire extent being simultaneously subjected to a cooling action, substantially as specified.

14. The process or method of soldering seams of tin plate cans, consisting in progressively fusing and progressively setting a solder coating between the members of the seam and fusibly united with one member thereof while the members of the seam are under heat and pressure simultaneously applied at successive minute portions thereof, the heat being applied at one side only to each successive portion, while the opposite side of the seam throughout its entire extent is subjected to a cooling action, substantially as specified.

15. The process of soldering covers on rectangular tin plate cans, consisting in subjecting one side of the seam throughout its entire extent to a cooling action and in progressively fusing and progressively setting a solder coating between the members of the seam and fusibly united with one member thereof while the members of the seam are subjected to the action of heat and pressure simultaneously applied at successive minute portions thereof, substantially as specified.

16. The process of soldering covers on rectangular tin plate cans, consisting in progressively fusing and progressively setting a solder coating between the members of the seam and fusibly united with one member thereof while the members of the seam are subjected to the action of heat and pressure simultaneously applied at successive minute portions thereof, the heat being applied upon one side only of the seam while the opposite side thereof throughout its entire extent is subjected to a cooling action, substantially as specified.

17. The process of soldering covers on rectangular tin plate cans, consisting in subjecting one side of the seam throughout its entire extent to a cooling action and in progressively fusing and progressively setting a solder coating between the members of the seam and fusibly united with one member thereof while the members of the seam are subjected to the action of heat and pressure simultaneously applied at successive minute portions thereof, said progressive fusing and setting operation beginning at one corner of the can and ending at another, substantially as specified.

18. The process of soldering covers on rectangular tin plate cans, consisting in progressively fusing and progressively setting a solder coating between the members of the seam and fusibly united with one member thereof while the members of the seam are subjected to the action of heat and pressure simultaneously applied at successive minute portions thereof, the heat being applied upon one side only of the seam while the opposite side thereof throughout its entire extent is subjected to a cooling action, said progressive fusing and setting operation beginning at one corner of the can and ending at another, substantially as specified.

19. The process of soldering tongued covers on rectangular tin plate cans, consisting in subjecting one side of the seam throughout its entire extent to a cooling action and in progressively fusing and progressively setting a solder coating between the members of the seam and fusibly united with one member thereof while the members of the seam are under action of heat and pressure simultaneosly applied to successive minute portions thereof, said progressive fusing and setting operation beginning at one corner and ending at the tongued corner thereof, substantially as specified.

20. The process of soldering covers having tongues on rectangular tin plate cans, consisting in subjecting one side of the seam throughout its entire extent to a cooling action and in progressively fusing and progressively setting a solder coating between the members of the seam and fusibly united with one member thereof while the members of the seam are under action of heat and pressure simultaneously applied at successive portions thereof, said progressive fusing and progressive setting operation concluding at the tongue portion, substantially as specified.

FRED C. WASSMAN.
MAGNUS E. WIDELL.

Witnesses:
 EDMUN ADCOCK,
 WILLIAM A. GEIGER.